(12) United States Patent
Adler et al.

(10) Patent No.: US 12,620,651 B2
(45) Date of Patent: May 5, 2026

(54) THERMAL MANAGEMENT SYSTEM FOR A BATTERY AND METHODS OF USING THE SYSTEM

(71) Applicant: The Regents of The University of Michigan, Ann Arbor, MI (US)

(72) Inventors: Eytan Adler, Ann Arbor, MI (US); Joaquim R.R.A. Martins, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 676 days.

(21) Appl. No.: 18/118,330

(22) Filed: Mar. 7, 2023

(65) Prior Publication Data

US 2024/0304894 A1     Sep. 12, 2024

Related U.S. Application Data

(60) Provisional application No. 63/318,044, filed on Mar. 9, 2022.

(51) Int. Cl.
| | |
|---|---|
| *H01M 10/6556* | (2014.01) |
| *H01M 10/48* | (2006.01) |
| *H01M 10/613* | (2014.01) |
| *H01M 10/633* | (2014.01) |
| *H01M 50/204* | (2021.01) |

(52) U.S. Cl.
CPC ..... *H01M 10/6556* (2015.04); *H01M 10/486* (2013.01); *H01M 10/613* (2015.04); *H01M 10/633* (2015.04); *H01M 50/204* (2021.01)

(58) Field of Classification Search
CPC ........... H01M 10/6556; H01M 10/486; H01M 10/613; H01M 10/633; H01M 50/204; H01M 10/615; H01M 10/625; H01M 10/63; H01M 10/6568; Y02E 60/10
See application file for complete search history.

(56) References Cited

U.S. PATENT DOCUMENTS

| | | | |
|---|---|---|---|
| 7,172,831 B2 | 2/2007 | Jaura et al. | |
| 9,461,346 B2 | 10/2016 | Becker et al. | |
| 2016/0079637 A1 | 3/2016 | Nemesh et al. | |
| 2016/0226110 A1* | 8/2016 | Jin ...................... | H01M 10/613 |
| 2018/0178615 A1* | 6/2018 | Xia ..................... | H01M 10/486 |
| 2020/0164718 A1* | 5/2020 | Takei ................... | B60L 3/0061 |

(Continued)

FOREIGN PATENT DOCUMENTS

| | | | | | |
|---|---|---|---|---|---|
| CN | 104577254 A | * | 4/2015 | ............. | Y02E 60/10 |
| CN | 106166933 A | * | 11/2016 | ......... | B60H 1/00278 |

(Continued)

OTHER PUBLICATIONS

Mahamud, R. et al., Reciprocating Air Flow for Li-Ion Battery Thermal Management to Improve Temperature Uniformity, Journal of Power Sources, 2011, 196:5685-5696.

*Primary Examiner* — Kaity V Chandler
(74) *Attorney, Agent, or Firm* — Quarles & Brady LLP

(57) ABSTRACT

Disclosed are systems and methods for using a thermal management system to cool a battery cell. The disclosed devices include a housing, a plurality of battery cells, a coolant loop, a circulation pump, a refrigerator, and a control valve for periodically reversing the flow of coolant within the coolant loop.

22 Claims, 2 Drawing Sheets

(56)                References Cited

U.S. PATENT DOCUMENTS

| | | | | |
|---|---|---|---|---|
| 2020/0331504 A1 * | 10/2020 | Glinka | .............. | H01M 10/6568 |
| 2020/0335839 A1 * | 10/2020 | Hekmat | .............. | H01M 10/659 |
| 2020/0403283 A1 * | 12/2020 | Gao | ................... | H05K 7/20309 |

FOREIGN PATENT DOCUMENTS

| | | | | | |
|---|---|---|---|---|---|
| CN | 206379429 U | * | 8/2017 | .......... | H01M 10/625 |
| CN | 208170778 U | * | 11/2018 | ............. | Y02E 60/10 |
| CN | 110061323 A | * | 7/2019 | .......... | H01M 10/615 |
| CN | 111347939 A | * | 6/2020 | ........ | H01M 10/6563 |
| CN | 212289440 U | * | 1/2021 | ............. | Y02E 60/10 |
| CN | 212323076 U | * | 1/2021 | ............. | Y02E 60/10 |
| CN | 113782868 A | * | 12/2021 | .......... | H01M 10/647 |
| FR | 2982935 A1 | * | 5/2013 | ........ | H01M 10/6568 |
| JP | 2021089811 A | * | 6/2021 | ............. | Y02E 60/10 |
| KR | 20210059306 A | * | 5/2021 | .......... | H01M 10/617 |
| WO | WO-2012077062 A1 | * | 6/2012 | ........ | B60H 1/00278 |
| WO | WO-2020125684 A1 | * | 6/2020 | .......... | H01M 10/663 |

* cited by examiner

THERMAL MANAGEMENT SYSTEM FOR A BATTERY AND METHODS OF USING THE SYSTEM

CROSS-REFERENCE TO RELATED APPLICATIONS

This application claims priority to U.S. Patent Application No. 63/318,044 filed Mar. 9, 2022.

STATEMENT REGARDING FEDERALLY SPONSORED RESEARCH

This invention was made with government support under grant number 80NSSC18M0151 awarded by the National Aeronautics and Space Administration. The government has certain rights in this invention.

BACKGROUND

As the power density of batteries continues to increase, engineers must consider the thermal constraints on the battery cells more and more. If the cooling system is inadequately sized, the performance of the battery-powered vehicle or aircraft suffers. A common limiting factor that determines the size of the thermal management system (TMS) is the temperature of the hottest battery cell, since it is the one closest to exceeding the temperature constraint. The most popular battery pack cooling methods are using bandoliers or a continuous ribbon. The bandolier (sometimes called bandolero) method uses a series of parallel cooling channels through the battery pack. In contrast, the continuous ribbon technique has a single cooling ribbon that serpentines through the battery cells. Both methods face a similar problem, in that, as the coolant travels past the battery cells it heats up, causing the battery cells toward the end of the ribbon to be cooled less than the batteries at the beginning of the ribbon. Since the hottest batteries size the cooling system, the TMS must be sized to keep temperature of the battery cells at the end of the cooling ribbon under the temperature constraint. This leaves the batteries at the beginning of the coolant loop colder than they need to be, meaning more energy has been put into cooling the batteries than is ideal.

Therefore, there is a need in the art for an improved battery thermal management system.

SUMMARY

Disclosed are battery thermal management systems and methods of using the same. The present disclosure addresses the aforementioned drawbacks by providing systems and methods that periodically change the direction of coolant flow in a battery housing using a control valve, and an optional computer system that determines when to actuate and reverse the flow of coolant. The computer system determines when to actuate the control valve to reverse the flow of coolant based on coolant and/or battery cell temperatures. This allows the thermal management system to direct the coldest coolant to the hotter side of the battery pack first. The result is a cooled battery pack with a more uniform temperature profile. More uniform temperature means all the batteries can be at a temperature near a specified constraint, as opposed to just the ones at the end of a cooling loop. Thus, less energy and weight are wasted on the thermal management system. Additionally, cell efficiency is optimized at moderate temperatures. The provided thermal management system and method can hold all of the cells closer to the optimum temperature so they perform more efficiently, further improving vehicle or aircraft range. In some embodiments, the control valve is built directly into the battery housing so that integrating the present disclosure into a vehicle or aircraft could be as easy as swapping out the housing. This present disclosure allows the thermal management system to switch the coolant flow direction intelligently and automatically, as opposed to conventional battery coolant loops being stuck in a single configuration. This modification provides a lighter and more efficient thermal management system, resulting in better vehicle and aircraft performance.

In one aspect, the present disclosure provides a battery thermal management system comprising: a housing; a plurality of battery cells positioned in the housing, the plurality of battery cells extending from a first end to a second end in the housing; a coolant loop in thermal communication with at least a portion of the battery cells, the coolant loop including a circulation pump for circulating the coolant within the coolant loop, the coolant loop including a refrigerator for cooling heated coolant; a control valve for regulating the flow of the coolant in the coolant loop, the control valve being alterable between a first position and a second position, wherein the control valve in the first position receives the coolant from the circulation pump and directs the coolant to flow from the first end to the second end of the battery cells to produce heated coolant, wherein the heated coolant is received by the control valve in the first position and directed to the refrigerator for cooling, and wherein the control valve in the second position receives the coolant from the circulation pump and directs the coolant to flow from the second end to the first end of the battery cells to produce the heated coolant, wherein the heated coolant is received by the control valve in the second position and directed to the refrigerator for cooling.

In some embodiments, the control valve is positioned directly within the housing. In some embodiments, the coolant loop is in direct contact with or positioned proximal to the battery cells.

The battery thermal management system can further comprise: a first temperature sensor for monitoring the temperature of coolant or battery cells positioned at or proximal to the first end; a second temperature sensor for monitoring the temperature of coolant or battery cells positioned at or proximal to the second end; and a computer system comprising a processor and a memory, the computer system being configured to: (A1) receive temperature data from the first temperature sensor; and (B1) alter the control valve to transition from the first position to the second position when the first temperature sensor reaches a first set-point temperature; or (A2) receive temperature data from the second temperature sensor; and (B2) alter the control valve to transition from the second position to the first position when the second temperature sensor reaches a second set-point temperature.

The battery thermal management system can further comprise: a computer system comprising a processor and a memory, the computer system being configured to: alter the control valve to periodically transition between the first position and the second position after a set duration.

In some embodiments, the control valve is a four-way valve. In some embodiments, the coolant is selected from a tetrafluoroethane, ethylene glycol, propylene glycol, or mixtures thereof. In some embodiments, the battery cells comprise a battery type selected from lithium ion, lithium ion polymer, nickel metal hydride, nickel cadmium, nickel hydrogen, nickel zinc, silver zinc, or combinations thereof.

The battery thermal management system can further comprise columns of battery cells arranged within the housing. The coolant loop can be arranged in a bandolier configuration. The coolant loop can be arranged in a continuous ribbon configuration.

In another aspect, the present disclosure provides a method of cooling a battery system having a plurality of battery cells positioned in a housing, where the battery cells extend from a first end to a second end in the housing. The battery system includes a coolant loop in thermal communication with at least a portion of the battery cells, where the coolant loop includes a circulation pump for circulating coolant within the coolant loop. The coolant loop further includes a refrigerator for cooling heated coolant and a control valve for regulating flow in the coolant loop. In some embodiments, the method includes circulating coolant from the circulation pump to the control valve in a first position, where the first position of the control valve directs coolant to flow from the first end to the second end of the battery cells to produce a heated coolant. In some embodiments, the heated coolant is received by the control valve in the first position and directed to the refrigerator for cooling. The method further includes altering the control valve from the first position to a second position, where the control valve in the second position receives the coolant from the circulation pump and directs the coolant to flow from the second end to the first end of the battery cells to produce the heated coolant. In some embodiments, the heated coolant is received by the control valve in the second position and directed to the refrigerator for cooling.

In some embodiments of the method, the control valve is positioned directly within the housing.

In some embodiments of the method, the coolant loop is in direct contact with or positioned proximal to the battery cells.

The method can further comprise: measuring a temperature of the battery cells or coolant at the first end and altering the control valve from the first position to the second position when the first end of the battery cells reaches a first set-point temperature; or measuring a temperature of the coolant or battery cells at the second end of the battery cells and altering the control valve from the second position to the first position when the second end of the battery cells reaches a second set-point temperature.

The method can further comprise: altering the control valve to periodically transition between the first position and the second position after a set duration.

In some embodiments of the method, the control valve is a four-way valve. In some embodiments of the method, the coolant is selected from a tetrafluoroethane, ethylene glycol, propylene glycol, or mixtures thereof. In some embodiments of the method, the battery cells comprise a battery type selected from lithium ion, lithium ion polymer, nickel metal hydride, nickel cadmium, nickel hydrogen, nickel zinc, silver zinc, or combinations thereof.

In some embodiments of the method, the columns of battery cells arranged within the housing. In some embodiments of the method, the coolant loop is arranged in a bandolier configuration. In some embodiments of the method, the coolant loop is arranged in a continuous ribbon configuration.

BRIEF DESCRIPTION OF THE DRAWINGS

The disclosure will hereafter be described with reference to the accompanying drawings, wherein like reference numerals denote like elements.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery cells" as used herein refers to multiple individual batteries, the individual batteries are electrically interconnected to achieve the desired voltage and capacity for a particular application. The terms "battery" and "battery system" may be used interchangeably and as used herein refer to an electrical energy storage system that has the capability to be charged and discharged such as a battery, battery pack, capacitor or supercapacitor.

Battery Thermal Management System

Figures 1A, 1B:
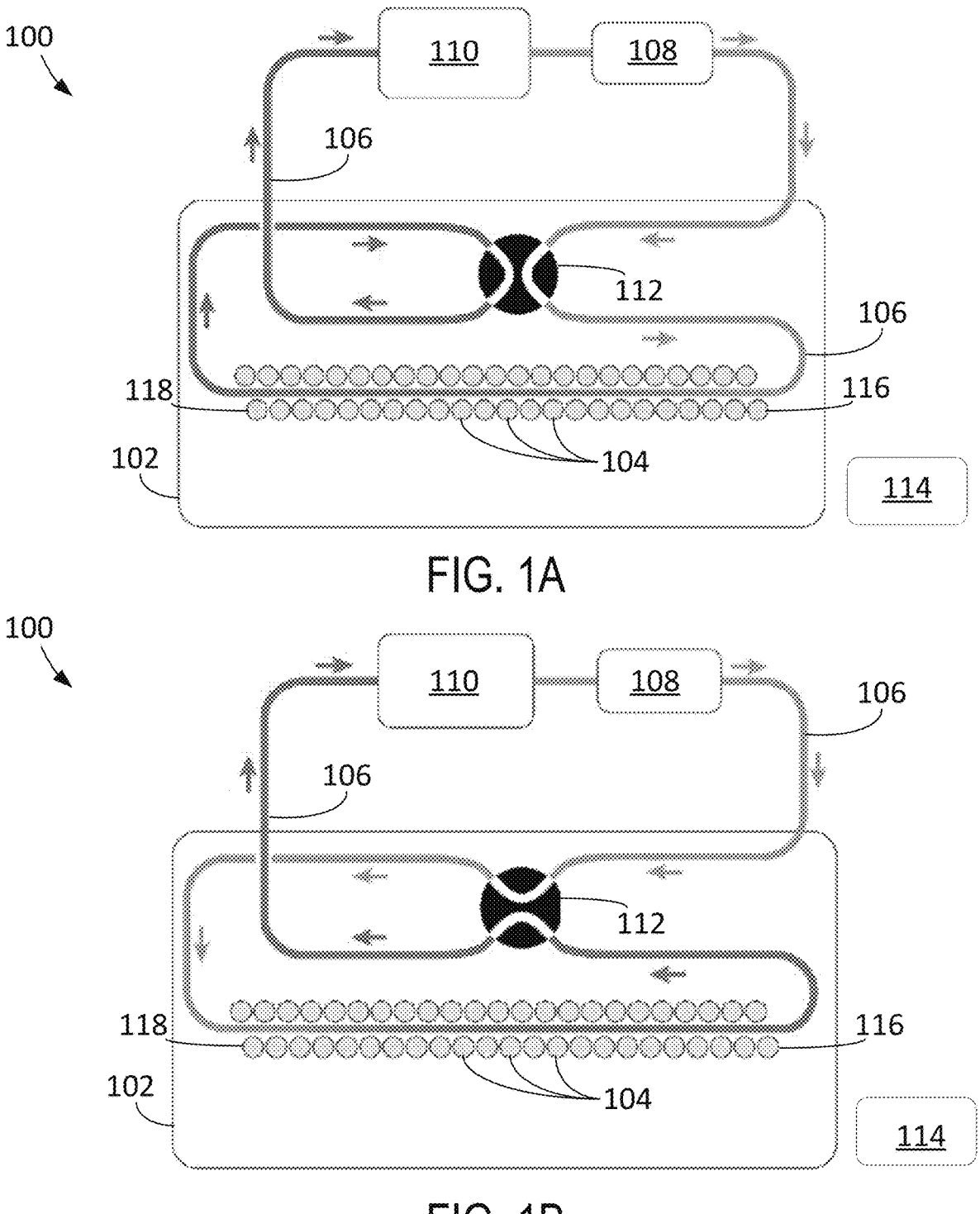
FIG. 1A is a schematic illustration of a battery thermal management system in a first position according to some embodiments of the present disclosure.
FIG. 1B is a schematic illustration of a battery thermal management system in a second position according to some embodiments of the present disclosure.

Referring to FIGS. 1A-1B, a schematic illustration of a battery thermal management system 100 is illustrated. In general, the battery thermal management system 100 includes a housing 102, a plurality of battery cells 104, a coolant loop 106, a circulation pump 108, a refrigerator 110, and a control valve 112. The thermal management system 100 further includes a control system 114. Further details of these systems are provided below.

In some embodiments, a plurality of battery cells 104 are positioned in the housing 102 and extend from a first end 116 to a second end 118. The battery cells 104 may be arranged within the housing 102 in any format, e.g., the battery cells 104 may form an array having any number of rows and columns. The battery cells 104 may be in thermal communication with a coolant loop 106. As used herein, the terms "thermal communication" or "thermally coupled," which may be used interchangeably, describe two or more components in the system 100 that are configured to allow heat transfer from one component to another. The coolant loop 106 may be placed in thermal communication with a portion or all of the battery cells 104 by being placed in direct contact with the battery cells 104. Alternatively or additionally, the coolant loop 106 may be placed in thermal communication with a portion or all of the battery cells 104 by being in indirect contact with the battery cells 104 (e.g., positioned proximal to the battery cells 104).

In some embodiments, the coolant loop 106 extends along the first end 116 to the second end 118 of the battery cells 104. The coolant loop 106 may be positioned between rows and/or columns of the battery cells 104 to be placed in thermal communication with the battery cells 104. In some embodiments, the coolant loop 106 includes a circulation pump 108 for circulating the coolant within the coolant loop 106, and a refrigerator 110 for cooling heated coolant within the coolant loop 106. Any known coolant or heat transfer fluid may be used. Exemplary coolants include, but are not limited to, tetrafluoroethane, ethylene glycol, propylene glycol, or mixtures thereof.

In some embodiments, the battery thermal management system 100 includes a control valve 112 for regulating the flow of coolant in the coolant loop 106. As shown in FIGS. 1A-1B, the control valve 112 is alterable between a first position (FIG. 1A) and a second position (FIG. 1B). In some embodiments, the control valve 112 in the first position receives the coolant from the circulation pump 108 and directs the coolant to flow from the first end 116 to the second end 118 of the battery cells 104 to produce a heated coolant. While in the first position, the control valve 112 receives the heated coolant and directs the heated coolant to the refrigerator 112. In some embodiments, the control valve 112 is a four-way valve having a first passageway for placing the circulation pump in fluid communication with the coolant loop 106 located at the first end 116 of the battery cells 104, and a second passageway that places the coolant loop 106 located at the second end 118 in fluid communication with the refrigerator 110.

The control valve 112 may actuate or be manually altered to transition from the first position to the second position. While in the second position, the control valve 112 receives the coolant from the circulation pump 108 and directs the coolant to flow form the second end 118 to the first end 116 of the battery cells 104 to produce the heated coolant. While in the second position, the control valve 112 receives the heated coolant and directs the heated coolant to the refrigerator 112. As shown in FIG. 1B, the control valve 112 alters to the second position such that the second passageway places the circulation pump in fluid communication loop 106 located at the second end 118 of the battery cells 104, and the first passageway places the coolant loop 106 at the first end 116 in fluid communication with the refrigerator 110. A single control valve or multiple control valves may be used.

In some embodiments, the battery thermal management system 100 includes one or more temperature sensors for monitoring the temperature of coolant and/or battery cells 104. For example, the battery thermal management system 100 may include a first temperature sensor for monitoring the temperature of coolant and/or battery cells 104 positioned at or proximal to the first end 116. The battery thermal management system 100 may also include a second temperature sensor for monitoring the temperature of coolant and/or battery cells 104 positioned at or proximal to the second end 118.

In some embodiments, the battery thermal management system 100 includes a computer system 114. The computer system 114 includes at least one hardware processor and a memory. The computer system 114 can be a workstation, a notebook computer, a tablet device, a mobile device, a multimedia device, a network server, a mainframe, one or more controllers, one or more microcontrollers, or any other general-purpose or application-specific computing device.

The computer system 114 may operate autonomously or semi-autonomously, or may read executable software instructions from the memory or computer-readable medium (e.g., hard drive, CD-ROM, flash memory), or may receive instructions via an input from a user, or any other source logically connected to a computer or device, such as another networked computer or server. Thus, in some embodiments, the computer system 114 can also include any suitable device for reading computer-readable storage media.

In general, the computer system 114 is programmed or otherwise configured to implement methods and algorithms described herein. For instance, the computer system 114 can be programmed to receive temperature data from the first temperature sensor and alter the control valve 112 to transition from the first position to the second position when the first temperature sensor reaches a first set-point temperature. Similarly, the computer system 114 can be programmed to receive temperature data from the second temperature sensor and alter the control valve 112 to transition from the second position to the first position when the second temperature reaches a second set-point temperature. In some embodiments, the first set-point temperature and the second set-point temperature for the first temperature sensor and the second temperature sensor may range from 40° C. to 80° C., 40° C. to 60° C., or 60° C. to 80° C. One approach to determine the first temperature for the control valve 112 to transition from the first position to the second position and to determine the second temperature to transition from the second position to the first position could be based on the battery's maximum temperature limit (which depends on battery chemistry, design, etc.) For example, a maximum temperature limit of 60° C. (140° F.) is typically recommended for lithium ion batteries, and a maximum temperature limit of 45° C. (113° F.) is typically recommended for nickel-metal hydride batteries, and a maximum temperature limit of 80° C. (176° F.) is typically recommended for lithium ion polymer batteries.

In some embodiments, the computer system 114 can be programmed to alter the control valve 112 to periodically transition between the first position and the second position after a set duration. For example, the computer system 114 can be programmed to alter the control valve 112 to transition between the first position and the second position after a set duration of at least 30 seconds to 1 day or more.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (e.g., hard disks, floppy disks), optical media (e.g., compact discs, digital video discs, Blu-ray discs), semiconductor media (e.g., random access memory ("RAM"), flash memory, electrically programmable read only memory ("EPROM"), electrically erasable programmable read only memory ("EEPROM")), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

Figure 2:
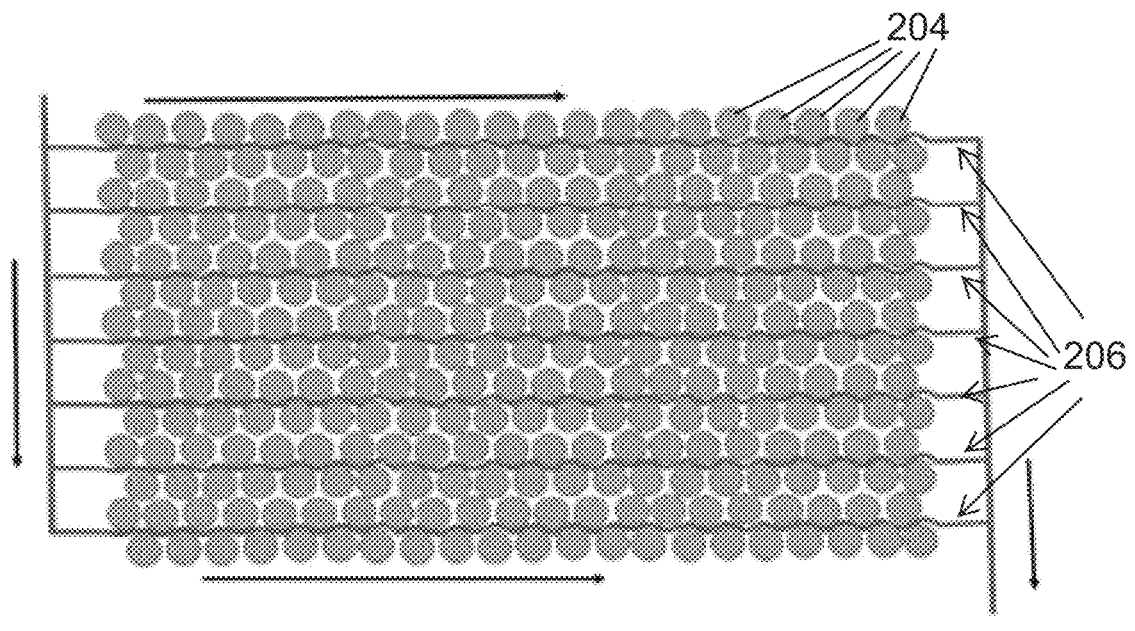
FIG. 2 is a schematic illustration of a battery thermal management system in a bandolier configuration according to some embodiments of the present disclosure.
Figure 3:
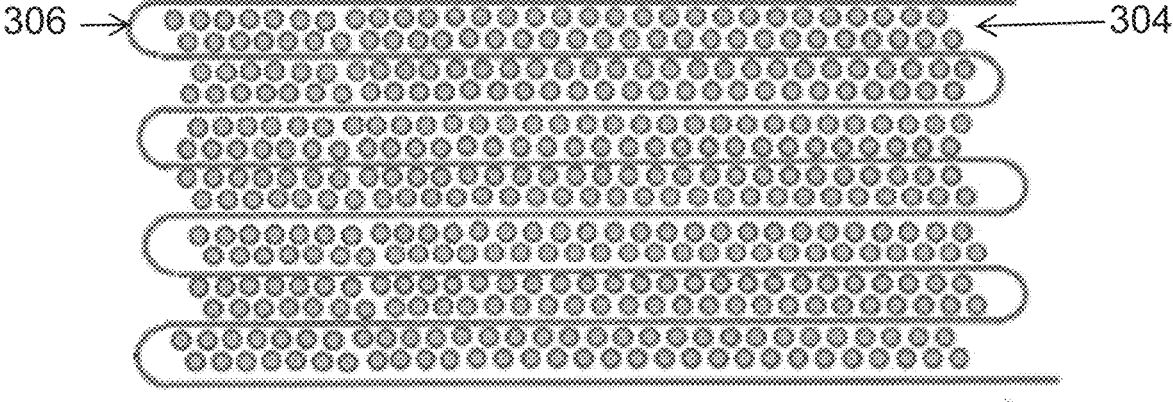
FIG. 3 is a schematic illustration of a battery thermal management system in a continuous ribbon configuration according to some embodiments of the present disclosure.

Referring to FIGS. 2 and 3, the battery thermal management system may comprise battery cells arranged in an array, e.g., having columns or rows of battery cells arranged within the housing. In some embodiments, the coolant loop may be arranged as a bandolier (FIG. 2) or as a continuous ribbon (FIG. 3). The bandolier configuration includes a series of parallel cooling channels 206 that extend through the battery cells 204. In contrast, the continuous ribbon has a single ribbon 306 that serpentines through the battery cells 304.

Method of Using the Battery Thermal Management System

In some embodiments, the present disclosure provides a method for cooling battery cells 104 using the battery thermal management system 100. The method includes circulating coolant from the circulation pump 108 to the control valve 112 in a first position, where the first position of the control valve 112 directs coolant to flow from the first end 116 to the second end 118 of the battery cells 104 to produce a heated coolant. While in the first position, the control valve 112 further receives the heated coolant and directs it to the refrigerator 110 for cooling.

The method further includes altering the control valve 112 from the first position to a second position, where the control valve 112 in the second position receives the coolant from the circulation pump 108 and directs the coolant to flow from the second end 118 to the first end 116 of the battery cells 104 to produce a heated coolant. While in the second position, the control valve 112 further receives the heated coolant and directs it to the refrigerator 110 for cooling.

In some embodiments, the method further includes measuring a temperature of the battery cells 104 and/or coolant at or proximal to the first end 116. The method further includes altering the control valve 112 from the first position to the second position when the battery cells 104 or coolant located at the first end 116 reaches a first set-point temperature. In some embodiments, the first set-point temperature may range from 40° C. to 80° C., 40° C. to 60° C., or 60° C. to 80° C.

In some embodiments, the method further includes measuring a temperature of the battery cells 104 and/or coolant at or proximal to the second end 118. The method further includes altering the control valve 112 from the second position to the first position when the battery cells 104 or coolant located at the second end 118 reaches a second set-point temperature. In some embodiments, the second set-point temperature may range from 40° C. to 80° C., 40° C. to 60° C., or 60° C. to 80° C.

In some embodiments, the method further includes altering the control valve 112 to periodically transition between the first position and the second position after a set duration. For example, the computer system 114 may be programmed to alter the control valve 112 to transition from the first position to the second position after a duration of at least 30 seconds, at least 1 minute, at least 5 minutes, at least 10 minutes, at least 30 minutes, at least 1 hour, to less than 12 hours, or to less than 1 day.

The provided systems and methods offer advantageous over conventional thermal management systems. For example, conventional configurations flow coolant in a single direction, where the coolant travels past the battery cells and heats up causing the battery cells toward the end of the coolant loop to be cooled less than battery cells at the beginning. This leaves batteries at the beginning of the loop colder than they need to be, and the size of the cooling system is limited to the temperature constraint of the batteries at the end of the loop. The provided systems and methods offer a technical solution to this problem by providing a control valve that reverses the flow of coolant based on coolant and/or battery cell temperatures. This allows the thermal management system to direct the coldest coolant to the battery cells first. Routine swapping of the flow allows for a more uniform temperature during operation, which in turn results in less energy and weight that is wasted on the thermal management system.

In some embodiments, the control valve 112 is built directly into the housing 102, so that integrating the systems and methods provided herein with vehicles or aircrafts could be as easy as swapping out the housing 102.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A battery thermal management system comprising:
a housing;
a plurality of battery cells positioned in the housing, the plurality of battery cells extending from a first end to a second end in the housing;
a coolant loop in thermal communication with at least a portion of the battery cells, the coolant loop including a circulation pump for circulating the coolant within the coolant loop, the coolant loop including a refrigerator for cooling heated coolant;
a control valve for regulating the flow of the coolant in the coolant loop, the control valve being alterable between a first position and a second position,
wherein the control valve in the first position receives the coolant from the circulation pump and directs the coolant to flow from the first end to the second end of the battery cells to produce heated coolant, wherein the heated coolant is received by the control valve in the first position and directed to the refrigerator for cooling, and
wherein the control valve in the second position receives the coolant from the circulation pump and directs the coolant to flow from the second end to the first end of the battery cells to produce the heated coolant, wherein the heated coolant is received by the control valve in the second position and directed to the refrigerator for cooling.

2. The battery thermal management system of claim 1, wherein the control valve is positioned directly within the housing.

3. The battery thermal management system of claim 1, wherein the coolant loop is in direct contact with or positioned proximal to the battery cells.

4. The battery thermal management system of claim 1 further comprising:
a first temperature sensor for monitoring the temperature of coolant or battery cells positioned at or proximal to the first end;

a second temperature sensor for monitoring the temperature of coolant or battery cells positioned at or proximal to the second end;

a computer system comprising a processor and a memory, the computer system being configured to:

(A1) receive temperature data from the first temperature sensor;

(B1) alter the control valve to transition from the first position to the second position when the first temperature sensor reaches a first set-point temperature; or (A2) receive temperature data from the second temperature sensor;

(B2) alter the control valve to transition from the second position to the first position when the second temperature sensor reaches a second set-point temperature.

5. The battery thermal management system of claim 1 further comprising a computer system comprising a processor and a memory, the computer system being configured to:

alter the control valve to periodically transition between the first position and the second position after a set duration.

6. The battery thermal management system of claim 1, wherein the control valve is a four-way valve.

7. The battery thermal management system of claim 1, wherein the coolant is selected from a tetrafluoroethane, ethylene glycol, propylene glycol, or mixtures thereof.

8. The battery thermal management system of claim 1, wherein the battery cells comprise a battery type selected from lithium ion, lithium ion polymer, nickel metal hydride, nickel cadmium, nickel hydrogen, nickel zinc, silver zinc, or combinations thereof.

9. The battery thermal management system of claim 1 further comprising columns of battery cells arranged within the housing.

10. The battery thermal management system of claim 9, wherein the coolant loop is arranged in a bandolier configuration.

11. The battery thermal management system of claim 9, wherein the coolant loop is arranged in a continuous ribbon configuration.

12. A method for cooling battery cells using a thermal management system, the thermal management system having a plurality of battery cells positioned in a housing wherein the battery cells extend from a first end to a second end in the housing, a coolant loop in thermal communication with at least a portion of the battery cells wherein the coolant loop has a circulation pump for circulating coolant within the coolant loop, wherein the coolant loop has a refrigerator for cooling heated coolant, and a control valve for regulating flow in the coolant loop, the method comprising:

circulating coolant from the circulation pump to the control valve in a first position, wherein the first position of the control valve directs coolant to flow from the first end to the second end of the battery cells to produce a heated coolant, wherein the heated coolant is received by the control valve in the first position and directed to the refrigerator for cooling; and altering the control valve from the first position to a second position, wherein the control valve in the second position receives the coolant from the circulation pump and directs the coolant to flow from the second end to the first end of the battery cells to produce the heated coolant, and wherein the heated coolant is received by the control valve in the second position and directed to the refrigerator for cooling.

13. The method of claim 12, wherein the control valve is positioned directly within the housing.

14. The method of claim 12, wherein the coolant loop is in direct contact with or positioned proximal to the battery cells.

15. The method of claim 12 further comprising:

measuring a temperature of the battery cells or coolant at the first end and altering the control valve from the first position to the second position when the first end of the battery cells reaches a first set-point temperature; or measuring a temperature of the coolant or battery cells at the second end of the battery cells and altering the control valve from the second position to the first position when the second end of the battery cells reaches a second set-point temperature.

16. The method of claim 12 further comprising:

altering the control valve to periodically transition between the first position and the second position after a set duration.

17. The method of claim 12, wherein the control valve is a four-way valve.

18. The method of claim 12, wherein the coolant is selected from a tetrafluoroethane, ethylene glycol, propylene glycol, or mixtures thereof.

19. The method of claim 12, wherein the battery cells comprise a battery type selected from lithium ion, lithium ion polymer, nickel metal hydride, nickel cadmium, nickel hydrogen, nickel zinc, silver zinc, or combinations thereof.

20. The method of claim 12 further comprising columns of battery cells arranged within the housing.

21. The method of claim 20, wherein the coolant loop is arranged in a bandolier configuration.

22. The method of claim 20, wherein the coolant loop is arranged in a continuous ribbon configuration.

* * * * *